US008687580B2

(12) United States Patent
Singh et al.

(10) Patent No.: US 8,687,580 B2
(45) Date of Patent: Apr. 1, 2014

(54) METHOD AND SYSTEM FOR MINIMIZING LATENCIES FOR CONTENT PROTECTION IN AUDIO/VIDEO NETWORKS

(75) Inventors: Harkirat Singh, San Jose, CA (US); Lu Qian, Solon, OH (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 183 days.

(21) Appl. No.: 13/301,700

(22) Filed: Nov. 21, 2011

(65) Prior Publication Data

US 2012/0127937 A1 May 24, 2012

Related U.S. Application Data

(60) Provisional application No. 61/416,217, filed on Nov. 22, 2010.

(51) Int. Cl.
*H04W 72/04* (2009.01)

(52) U.S. Cl.
USPC .............................. 370/329; 370/338; 370/252

(58) Field of Classification Search
USPC .......... 370/329, 331, 345, 338, 328; 455/437, 455/450, 466, 463
See application file for complete search history.

(56) References Cited

U.S. PATENT DOCUMENTS

| | | | |
|---|---|---|---|
| 6,324,288 B1 | 11/2001 | Hoffman | |
| 7,428,216 B2 | 9/2008 | Siddiqui et al. | |
| 7,672,241 B2 | 3/2010 | Foore et al. | |
| 7,684,430 B2 | 3/2010 | Gaur et al. | |
| 7,688,819 B2 | 3/2010 | Ramaiah et al. | |
| 7,948,961 B2* | 5/2011 | Mahesh et al. | 370/345 |
| 8,005,055 B2 | 8/2011 | Kwak et al. | |
| 8,023,976 B2 | 9/2011 | Shao et al. | |
| 8,040,909 B2 | 10/2011 | Yi et al. | |
| 8,155,321 B2 | 4/2012 | Devanand et al. | |
| 8,161,564 B2* | 4/2012 | Devanand et al. | 726/29 |
| 8,265,013 B2* | 9/2012 | Kim et al. | 370/329 |
| 8,400,960 B2* | 3/2013 | Hiertz et al. | 370/328 |
| 2006/0268886 A1 | 11/2006 | Sammour et al. | |
| 2007/0058559 A1 | 3/2007 | Xu | |
| 2007/0258419 A1 | 11/2007 | Zhao et al. | |
| 2008/0019347 A1* | 1/2008 | Shin et al. | 370/345 |
| 2009/0279524 A1* | 11/2009 | Yu et al. | 370/338 |

(Continued)

OTHER PUBLICATIONS

U.S. Final Office Action for U.S. Appl. No. 12/821,048 mailed Nov. 20, 2012.

(Continued)

*Primary Examiner* — Rasheed Gidado
(74) *Attorney, Agent, or Firm* — Kenneth L. Sherman, Esq.; Michael Zarrabian, Esq.; Sherman & Zarrabian LLP

(57) ABSTRACT

Reducing latencies for content protection in audio/video networks includes reserving a wireless channel for a time period to accommodate control message exchange for content protection in data communication between a wireless transmitter and wireless receiver over a wireless channel. The control message exchange includes wirelessly transmitting a control request message from the transmitter for content protection to the receiver, and transmitting a control response message from the receiver to the transmitter in reply. Reserving the wireless channel includes reserving the wireless channel for a time period that accommodates the control message exchange. The time period includes a single transmission opportunity period for communication on the wireless channel, to reduce latency for the control message exchange between the transmitter and receiver.

33 Claims, 9 Drawing Sheets

(56) References Cited

U.S. PATENT DOCUMENTS

2010/0165907 A1* 7/2010 Chu et al. .................. 370/312
2010/0166017 A1* 7/2010 Na et al. .................... 370/474
2011/0096681 A1 4/2011 Singh et al.

OTHER PUBLICATIONS

U.S. Advisory Action for U.S. Appl. No. 12/821,048 mailed Jan. 25, 2013.

Intel Corporation, "High-bandwidth Digital Content Protection (HDCP) Interface Independent Adaptation Specification Revision 2.0, Chapter 2.3: Locality Check", Oct. 23, 2008, pp. 16-17, Digital Content Protection LLC, USA.

IEEE Computer Society, "IEEE Std 802.11™-2007 (Revision of IEEE Std 802.11-1999 ), IEEE Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications," Jun. 12, 2007, pp. i-1184, IEEE, New York, USA.

Information Sciences Institute at University of Southern California, "RFC: 793, Transmission Control Protocol," DARPA Internet Program Protocol Specification, Sep. 1981, pp. i-85, DARPA, USA.

Newhouse, T. et al., "Resource-Controlled Remote Execution to Enhance Wireless Network Applications," Proceedings of 4th Workshop on Applications and Services in Wireless Networks (ASWN '04), 2004, pp. 30-38, IEEE, United States.

Xia, P. et al., "Short Range Gigabit Wireless Communications Systems: Potentials, Challenges, and Techniques," Proceedings of IEEE International Conference on Ultra-Wideband (ICUWB '07), 2007, pp. 123-128, IEEE, United States.

U.S. Non-Final Office Action for U.S. Appl. No. 12/821,048 mailed Aug. 1, 2012.

U.S. Non-Final Office Action for U.S. Appl. No. 12/821,048 mailed Apr. 10, 2013.

International Search Report and Written Opinion dated Jul. 9, 2012 for International Application No. PCT/KR2011/008861 from Korean Intellectual Property Office, filed Nov. 21, 2011, pp. 1-9, Seo-gu, Daejeon, Republic of Korea.

U.S. Notice of Allowance for U.S. Appl. No. 12/821,048 mailed Jul. 25, 2013.

* cited by examiner

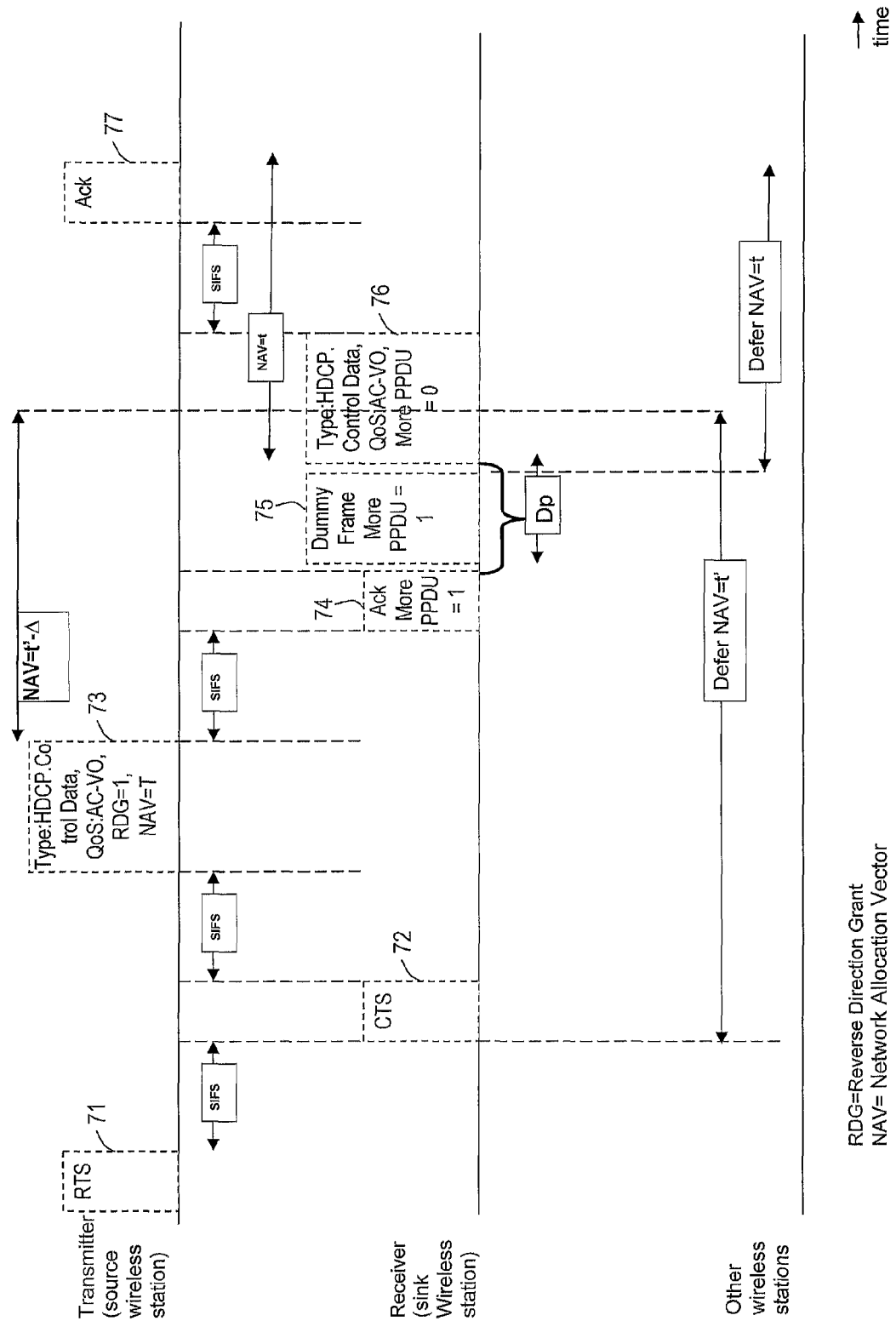

200

METHOD AND SYSTEM FOR MINIMIZING LATENCIES FOR CONTENT PROTECTION IN AUDIO/VIDEO NETWORKS

CROSS REFERENCE TO RELATED APPLICATIONS

This application claims the benefit of U.S. Provisional Patent Application Ser. No. 61/416,217, filed on Nov. 22, 2010, incorporated herein by reference.

FIELD OF THE INVENTION

The present invention relates in general to content protection, and in particular, to minimizing latencies for content protection audio/video networks.

BACKGROUND OF THE INVENTION

Existing content protection mechanisms, such as Highbandwidth Digital Content Protection (HDCP) 2.0, provide digital copy protection approaches for digital audio and video content (A/V content) transmitted between devices in digital systems. Such mechanisms attempt to prevent copy of such A/V content. However, mechanisms such as HDCP 2.0 impose very strict requirements on frame exchanges for protected content.

BRIEF SUMMARY OF THE INVENTION

Embodiments of the present invention relate to reducing latencies for content protection in audio/video networks. One embodiment comprises reserving a wireless communication medium for a time period that accommodates control message exchange for content protection in data communication between a wireless transmitter and a wireless receiver over a wireless communication medium.

The control message exchange includes transmitting a control request message from the wireless transmitter for content protection to the wireless receiver over a wireless communication medium, and transmitting a control response message from the wireless receiver to the wireless transmitter in reply to the request message.

Reserving the wireless communication medium includes reserving the wireless communication medium for a time period that accommodates said control message exchange, such that the time period comprises a single transmission opportunity period for communication on the wireless communication medium, to reduce latency for said control message exchange between the wireless transmitter and the wireless receiver.

These and other features, aspects and advantages of the present invention will become understood with reference to the following description, appended claims and accompanying figures.

BRIEF DESCRIPTION OF THE DRAWINGS

FIG. 2C shows a time line of control message exchange with latency reduction for data communication protection network of wireless devices in the network of FIG. 1A, according to another embodiment of the invention.

DETAILED DESCRIPTION OF THE INVENTION

Embodiments of the invention relate to reducing latencies for content protection in wireless audio/video networks. In one embodiment the present invention provides a method and system for minimizing latencies for content protection in wireless audio/video networks such as wireless networks implementing Wi-Fi technologies (Wi-Fi Alliance is an industry association providing certain standards for interoperability of wireless local area network (WLAN) devices based on the IEEE 802.11 standards). For example, Wi-Fi Display is an application of Wi-Fi technologies.

In one embodiment, to wirelessly transmit A/V data between a wireless source device and a wireless sink device, the wireless source and sink devices contend the wireless channel to obtain a transmission opportunity period. There may be unpredictable delays in obtaining a transmission opportunity period depending on the number of wireless devices in wireless network attempting to access the wireless channel. This affects message exchanges between wireless devices in a wireless network for establishing protection of content protecting such as using the HDCP protocol.

According to the HDCP protocol, a wireless transmitter and a wireless receiver enforce locality on the A/V content by requiring that the Round Trip Time (RTT) between a pair of messages to be no more than a specified duration. This is an attempt to prevent distribution of A/V content beyond a local area network such as a home network. For locality check between the transmitter and the receiver, the transmitter, after initiating the locality check, sets a watchdog timer and waits for time period before which it expects to receive a response from the receiver. The locality check is performed to ensure that content protection keys can only be exchanged if the RTT is less than said time period for point-to-point communication.

However, meeting such RTT may be difficult and unpredictable in a random access wireless network such as a wireless local area network (WLAN) based on the IEEE 802.11 standards (e.g., a Wi-Fi network). For wireless networks where multiple users are accessing the same wireless communication medium, random access delay may be introduced into the RTT. Frame exchange latency is unbounded. As a result, a locality check using RTT as in HDCP may fail because of random access delays, resulting in long delays for stream set up.

Figure 1A:
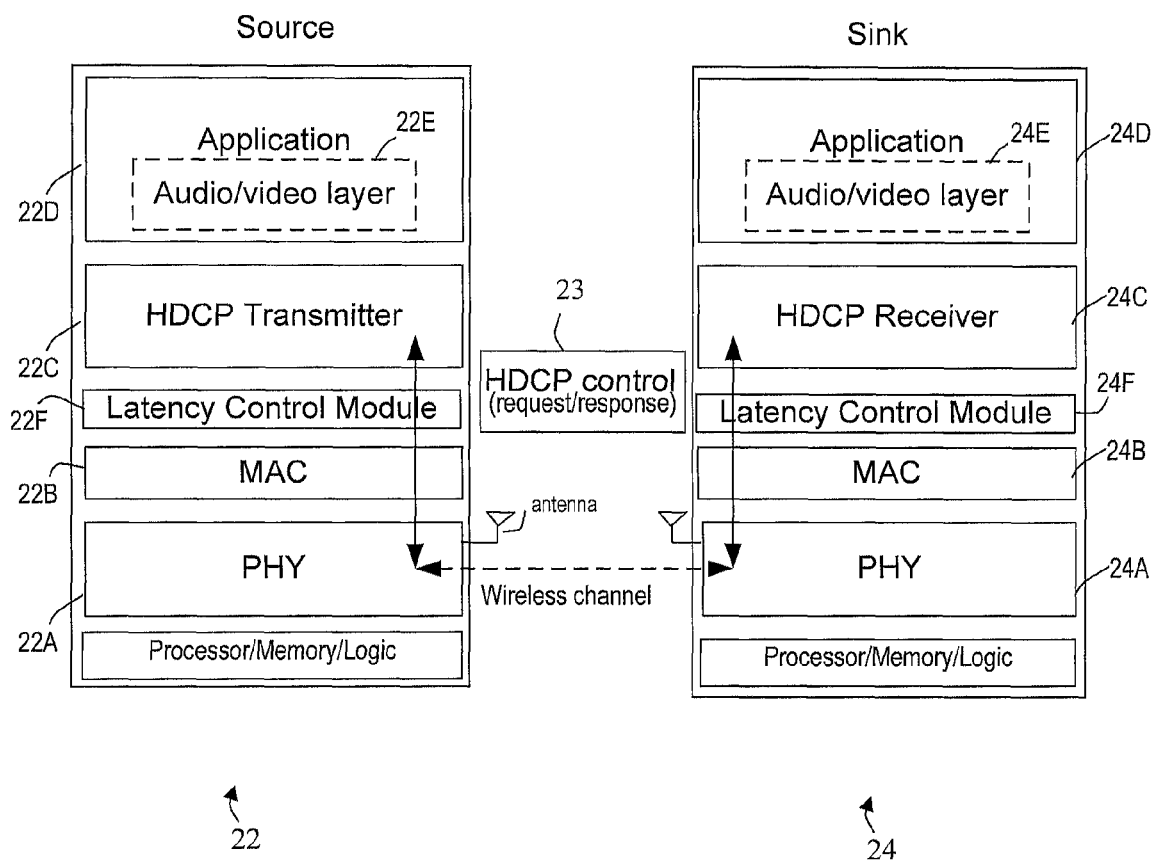
FIG. 1A shows a block diagram of a network of wireless devices including a source audio/video (A/V) device and a destination AV device, implementing latency reduction in control message exchange for data communication protection, according to an embodiment of the invention.
Figure 1B:
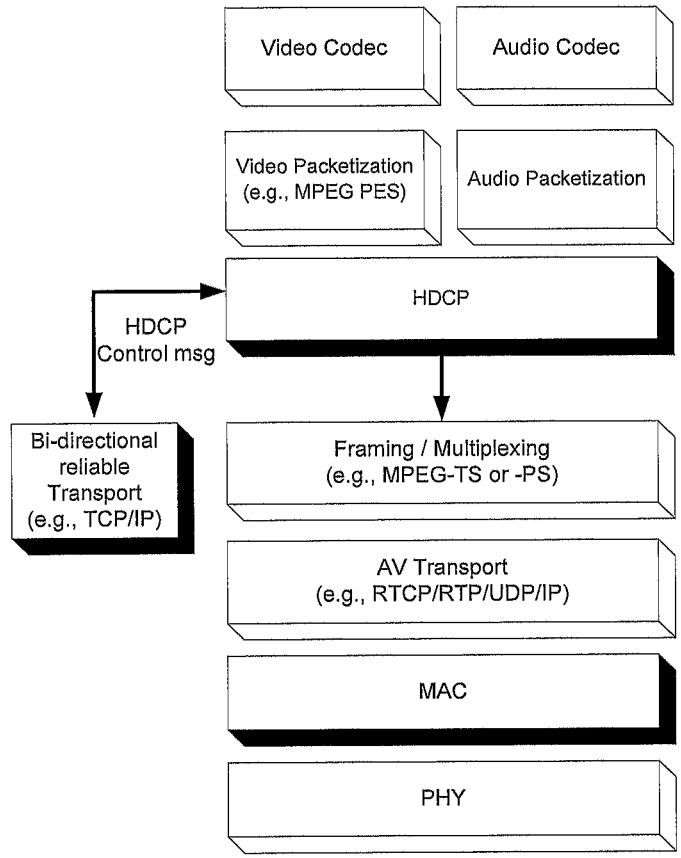
FIG. 1B shows a block diagram of a typical communication module for a wireless station implementing a Transmission Control Protocol/Internet Protocol (TCP/IP) stack using a locality check module implementing locality check.

FIG. 1A shows a block diagram of a wireless communication system 20, according to an embodiment of the invention. FIG. 1B shows a protocol stack 10 with HDCP 2.0 usage of TCP/IP for exchanging content protection related packets (HDCP control msg). The content protection message frame exchange latency is unbounded, resulting in connection drop and poor user experience. Layers in the TCP/IP model include, from highest to lowest: Application Layer, Transport Layer, Network/Internet Layer, Link Layer comprising physical and data link sub-layers. The TCP/IP layers can be loosely mapped to the Open System Architecture (OSI).

In one embodiment, the present invention provides a content protection process for reducing the time for locality check content protection message exchange between wireless A/V devices. The content protection process reduces delay in frame exchanges between wireless devices in a wireless network for protection of content communicated between the two devices over a wireless communication medium (e.g., radio frequency wireless channel).

To reduce latency for content protection related frame exchanges, in one embodiment of the invention the content protection process reserves a wireless channel for a sufficiently long period to accommodate for both request and response frame exchanges within a single transmission opportunity period (i.e., TXOP in IEEE 802.11) for transmission on the wireless channel. The reservation of a transmission opportunity period is achieved by transmitting request-to-send (RTS) and clear-to-send (CTS) followed by consecutive request and response frames. Wi-Fi Display technology utilizes wireless devices with IEEE 802.11 capabilities, wherein a content protection process according to an embodiment of the invention is useful with Wi-Fi Display devices.

Embodiments of the invention are described in relation to Wi-Fi Display technologies, for reducing latency for content protection to meet latency requirements. Embodiments of the invention are also useful for content protection in other wireless systems. In one embodiment, the present invention provides a content protection process for reducing the time for Content Protection by Wi-Fi Display devices.

In the following description, the following terminology is utilized:
  Wi-Fi Display Source device comprises a wireless device that wirelessly transmits Audio Video (AV) content or a wireless channel.
  Wi-Fi Display Sink device comprises a wireless device that wirelessly receives AV content over the wireless channel.
  Content Protection is a requirement for protecting copyrighted contents.
  Content Protection transmitter or Wi-Fi Display source comprises a Wi-Fi Display device that transmits protected content.
  Content Protection receiver or Wi-Fi Display sink comprises a Wi-Fi Display device that receives protected contents.

As shown in FIG. 1A, according to an embodiment of the invention the system 20 comprises a wireless source device 22 (e.g., a Wi-Fi Display Source device), and a wireless sink device (e.g., Wi-Fi Display Sink device). A frame structure is used for data transmission between the devices 22 and 24. A frame structure may be used for data transmission between the wireless devices 22 and 24. For example, a frame structure in a Media Access Control (MAC) layer and a physical (PHY) layer is utilized, wherein in a transmitter device, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver device, a preamble is attached to the PPDU, wherein the preamble can include channel estimation and synchronization information.

The wireless source device 22 comprises a PHY layer 22A (e.g., Wi-Fi PHY), a MAC layer 22B (e.g., Wi-Fi MAC), an HDCP transmitter layer 22C and an application layer 22D, wherein the application layer 22D includes an Audio/Video layer 22E. In one embodiment the application layer 22D and Audio/Video layer 22E pre-process A/V data for packetizing video streams, which are then converted to MAC packets by the MAC layer. The application layer 22D may further include an AV/C control process which sends stream transmission requests and control commands to access the wireless channel for transmission of packets. The PHY layer 22A includes radio frequency (RF) communication radio which transmits/receives signals under control of a baseband process. The baseband process allows communicating control information and audio/video information.

The wireless sink device 24 comprises a PHY layer 24A (e.g., Wi-Fi PHY), a MAC layer 24B (e.g., Wi-Fi MAC), an HDCP receiver layer 24C and an application layer 24D, wherein the application layer 24D includes an Audio/Video layer 24E. The application layer 24D and A/V layer 24E provide A/V post-processing for de-packetizing into streams the video information in received MAC packets. De-packetizing is reverse operation of the packetization. The receiver application layer 24D may further include AV/C control processing for stream control and wireless channel access. The PHY layer 24A is similar to the PHY layer 22A. In addition to (or in place of) typical wireless transmission, directional transmission (e.g., via beamforming, directional antennas) may be performed over multiple channels. The MAC/PHY layers may perform antenna training and beaming switching control.

To reduce latency for content protection related frame exchanges, in one embodiment of the invention, a content protection process (e.g., implemented in link layer process or IP/Network/Internet Layer process), and reserves a wireless channel for a sufficiently long period to accommodate for both request and response frame exchanges within a single transmission opportunity period (i.e., TXOP per IEEE 802.11) for transmission on the wireless channel.

In one embodiment of the invention, the content protection process described herein is implemented as latency control modules 22F and 24F shown in FIG. 1A. In one embodiment of the invention, the control modules 22F and 24F are implemented in the HDCP layers 22C and 24C, respectively. In one embodiment of the invention, the control modules 22F and 24F are implemented in the MAC layers 22B and 24B, respectively. In one embodiment of the invention, the control modules 22F and 24F are implemented in the MAC layers 22B, 24B and HDCP layers 22C and 24C.

As illustrated in FIG. 1A, for content protection, the source device 22 and the sink device 24 exchange time-critical HDCP control messages (frames) 23, such as locality, key, etc., over the wireless channel to enable content protection using locality check for the ensuing audio/video data communication from the source device 22 (e.g., transmitter) to the sink device (e.g., receiver). The HDCP transmitter and HDCP receiver enforce locality on the A/V content by requiring that the Round Trip Time (RTT) between a pair of HDCP control messages to be no more than a specified duration. This is an attempt to prevent distribution of A/V content beyond a local area network such as a home network.

The HDCP control messages 23 normally comprise two exchanges such as a request frame from the source 22 to the sink 24, and a response frame from the sink 24 to the source 22. FIG. 1A shows the case when the HDCP layer 22C is above the MAC layer 22B, and the HDCP layer 24C is above the MAC layer 24B. However, the present invention is not limited to such an implementation, and each of the HDCP layers 22C, 24C maybe above the TCP/IP stack.

Figure 2A:
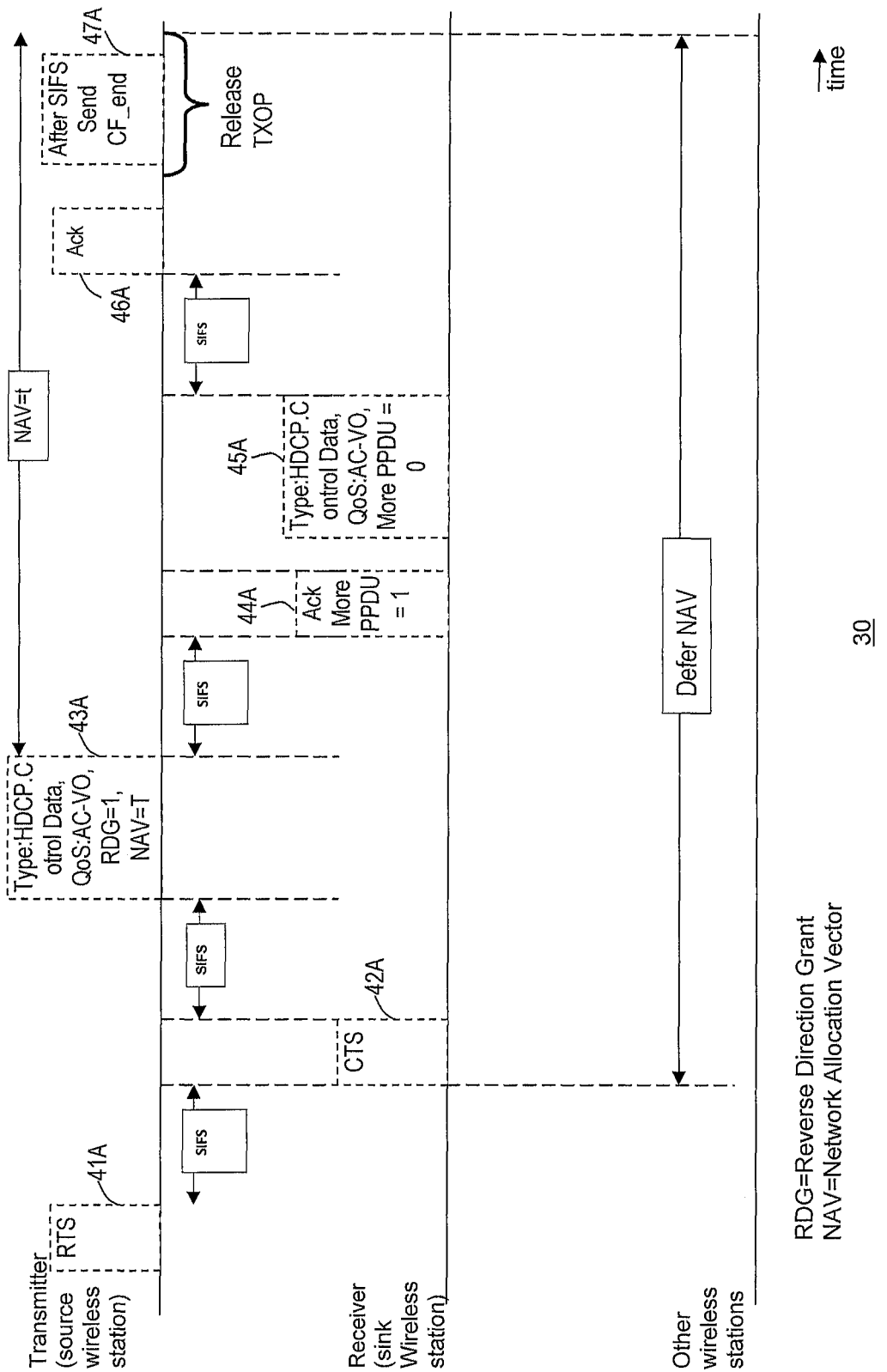
FIG. 2A shows a time line of control message exchange with latency reduction for data communication protection network of wireless devices in the network of FIG. 1A, according to an embodiment of the invention.
Figure 3A:
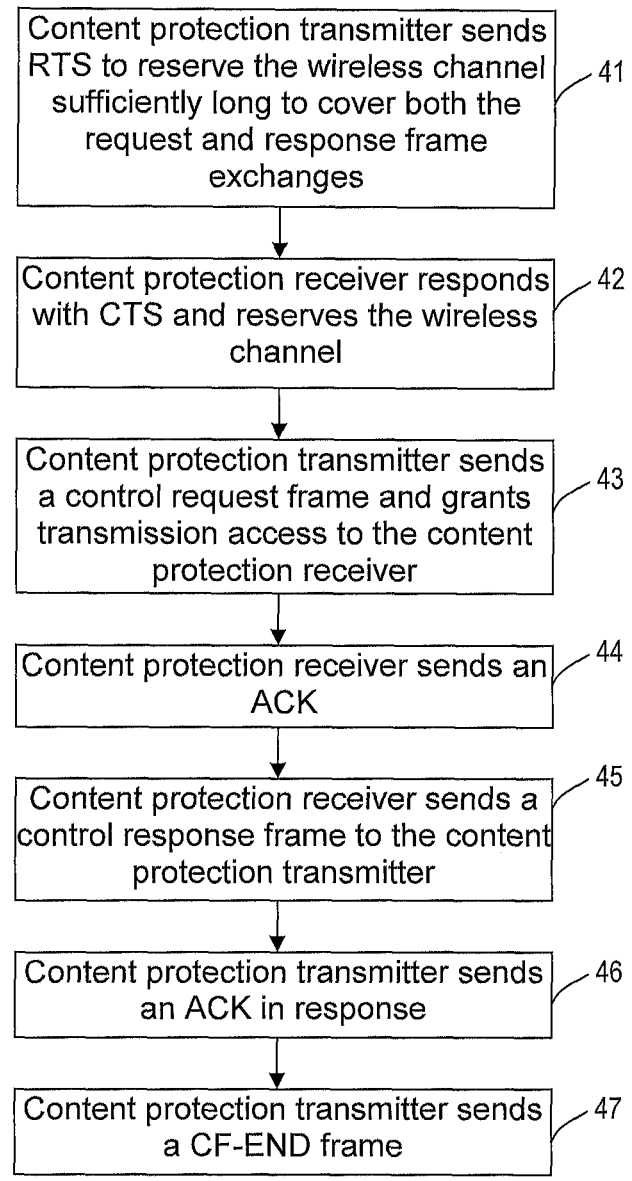
FIG. 3A shows a process for control message exchange with latency reduction for data communication protection network of wireless devices, in relation to FIG. 2A according to an embodiment of the invention.

FIG. 2A shows content protection control frame exchange in a content protection process, according to an embodiment of the invention. Specifically, FIG. 2A shows a control message exchange timeline 30 according to content protection process 40 in FIG. 3A, according to this embodiment of the invention, as follows:

Process block 41: A content protection transmitter (e.g., source wireless station 22) sends a RTS 41A to reserve the wireless channel for a time period sufficiently long to cover at least both the request and response frame exchanges.

Process block 42: The content protection receiver (e.g., sink wireless station 24) responds to the RTS with a CTS 42A to acknowledge the RTS and reserves the wireless channel from its neighboring wireless devices (e.g., other wireless station) including legacy wireless devices, for said time period according to the RTS.

Process block 43: The content protection transmitter sends a control request frame 43A (e.g., HDCP control request frame) and also grants transmission access for the wireless channel to the content protection receiver (by setting an RDG bit in the MAC header of the request frame to 1).

Process block 44: The content protection receiver sends an ACK 44A before sending a control response frame 45A.

Process block 45: Now that the content protection receiver has access rights to the wireless channel, the content protection receiver sends a control response frame 45A (e.g., HDCP control response frame) to the content protection transmitter. The response can be transmitted after Short Interframe Space (SIFS in IEEE 802.11 standards) or Reduced Interframe Space (RIFS) duration from the ACK 44A. In the response frame 45A, a More PPDU bit in the frame set to 0 to give control of the wireless channel back to the content protection transmitter.

Process block 46: The content protection transmitter sends an ACK 46A in response to the frame 45A.

Process block 47: The content protection transmitter sends a CF-END frame 47A to return (release) the unused transmission opportunity period for access to the wireless channel.

As such, one round of two-way control message exchange between the transmitter (source) and the receiver (sink) for content protection is complete. In one embodiment of the invention, in process block 47, instead of the content protection transmitter, the content protection receiver can send a CF-END to return the unused transmission opportunity period. In one embodiment of the invention, release of the remainder of the TXOP can be performed by the transmitter or the receiver.

For determining the transmission opportunity period, in certain cases the content protection receiver (e.g., wireless sink device 24) may not be able to generate the content protection control response frame within a SIFS+ACK duration. Additionally, the content protection transmitter (e.g., wireless source device 22) may not be able to accurately determine the delay occurring at the content protection receiver in generating the control message response (e.g., HDCP control message response). In such cases, according to one embodiment of the invention the content protection receiver extends the transmission opportunity period by handling the processing delay at the content protection receiver.

Figure 2B:
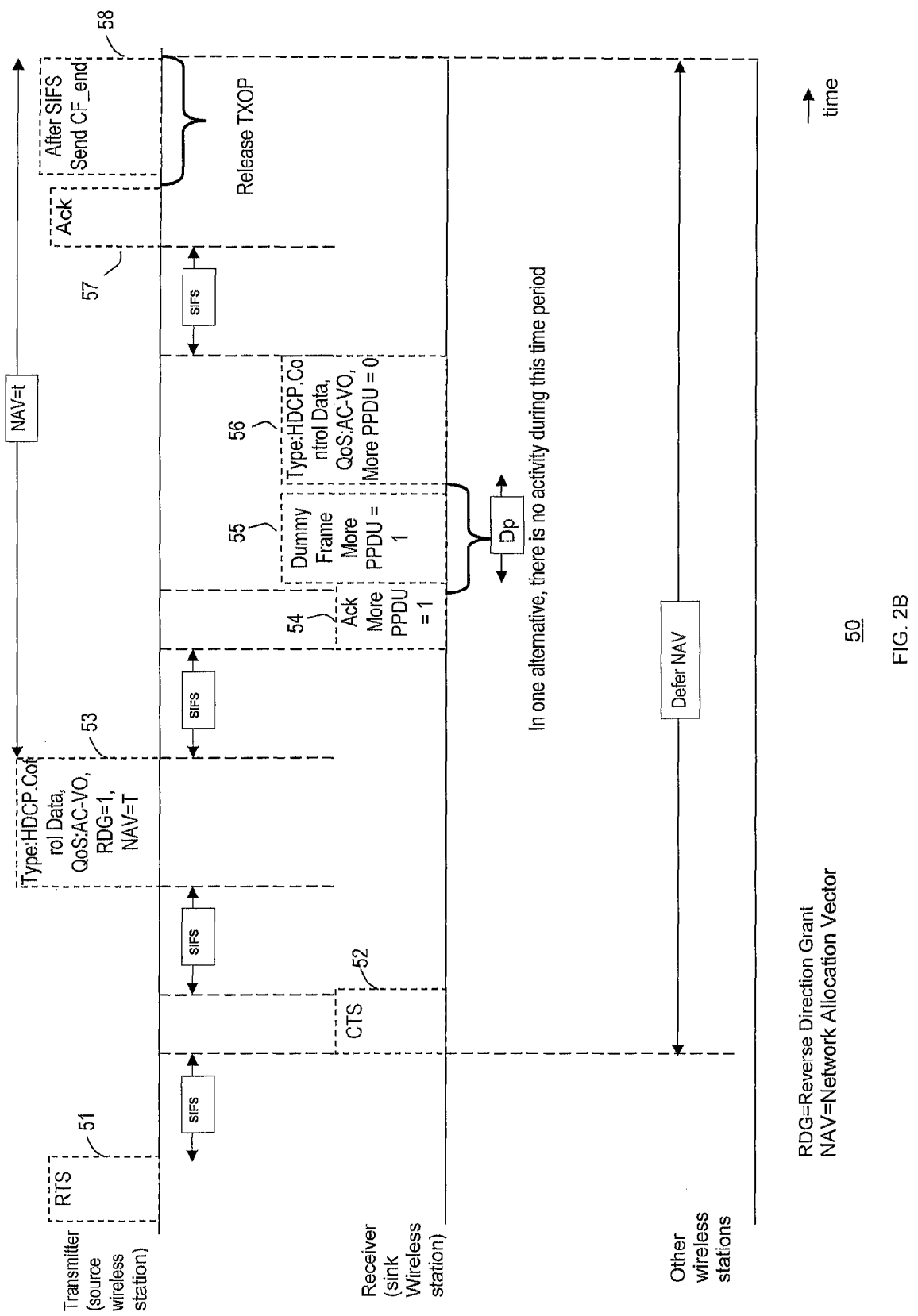
FIG. 2B shows a time line of control message exchange with latency reduction for data communication protection network of wireless devices in the network of FIG. 1A, according to another embodiment of the invention.
Figure 3B:
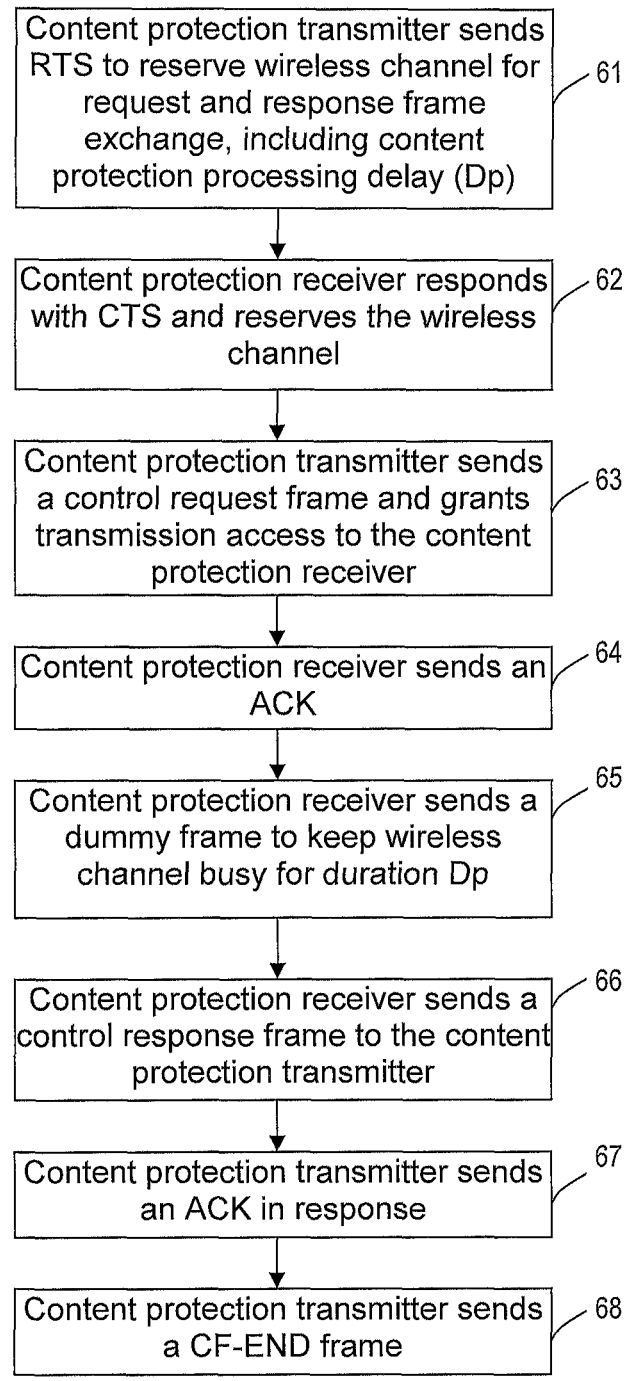
FIG. 3B shows a process for control message exchange with latency reduction for data communication protection network of wireless devices, in relation to FIG. 2B according to another embodiment of the invention.

FIG. 2B shows content protection control frame exchange, according to an embodiment of the invention, wherein the content protection transmitter (source device) has an estimate for a processing delay at the content protection receiver (sink device), wherein the content protection receiver sends a dummy frame (e.g., a QoS-Null frame) before generating the a control response. Specifically, FIG. 2B shows a control message exchange timeline 50 according to a process 60 in FIG. 3B according to this embodiment of the invention, as follows:

Process block 61: A content protection transmitter (e.g., source wireless station 22) sends a RTS 51 to reserve the wireless channel sufficiently long to cover both the content protection request and response frames including the content protection processing delay (Dp) at the content protection receiver (e.g., sink wireless station 24).

Process block 62: The content protection receiver responds to the RTS 51 with a CTS 52 to acknowledge the RTS and reserve the wireless channel from its neighboring wireless devices.

Process block 63: The content protection transmitter sends a request frame 53 and also grants wireless channel transmission access to the content protection receiver by setting an RDG bit in the MAC header of the request frame 53 to 1.

Process block 64: The content protection receiver sends an ACK frame 54 with the More PPDU bit set to 1 in the ACK frame.

Process block 65: Now that the content protection receiver has the access rights to the wireless channel, the content protection receiver sends a control response frame (e.g., HDCP control response) back to the transmitter. However, the response frame cannot be transmitted with SIFS/RIFS time and keeping the wireless channel ideal may have the potential of other wireless stations mistakenly grabbing the channel. The receiver sends a dummy frame such as QoS-NULL frame 55 to keep the wireless channel busy for a duration Dp.

Process block 66: After Dp, The content protection receiver sends a control response frame 56 (e.g., HDCP control response) with the More PPDU bit in the frame set to 0 to give control of the wireless channel back to the content protection transmitter.

Process block 67: The content protection transmitter sends an ACK 57.

Process block 68: The content protection transmitter sends a CF-END frame 58 to return (release) the unused transmission opportunity period. As such, one round of two-way control message exchange for content protection is completed.

As such, one round of two-way control message exchange for content protection is completed. According to an embodiment of the invention, in process block 68, instead of the content protection transmitter, the content protection receiver can send a CF-END frame to return the unused transmission opportunity.

Figure 3C:
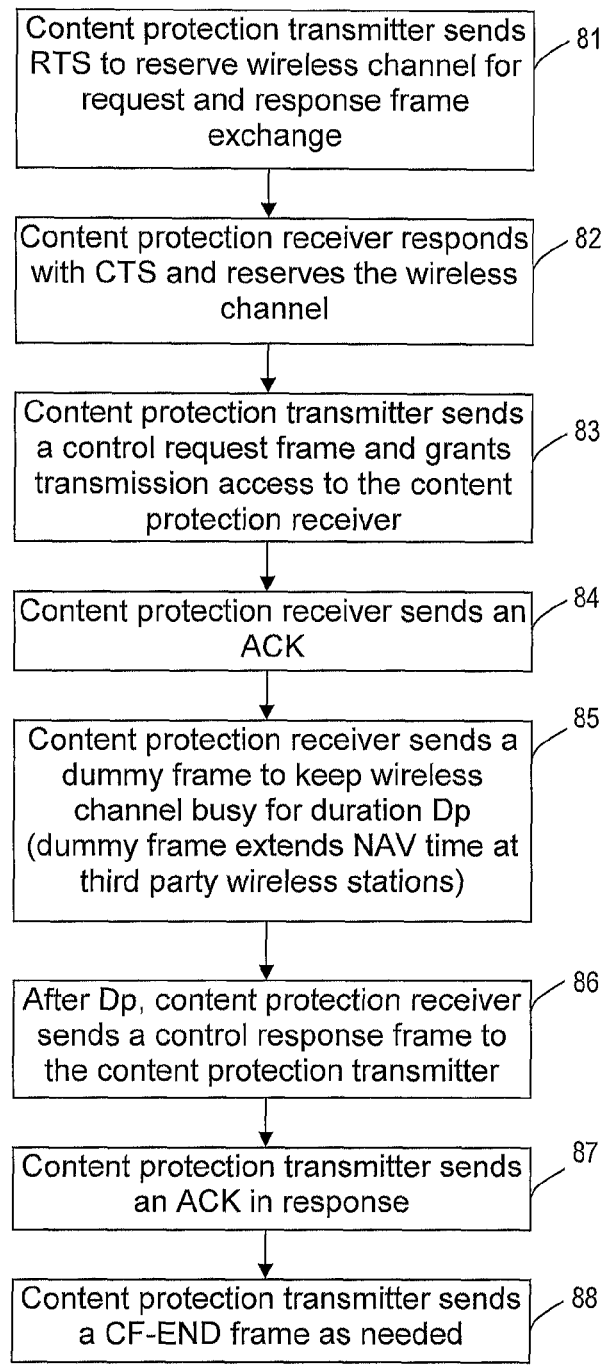
FIG. 3C shows a process for control message exchange with latency reduction for data communication protection network of wireless devices, in relation to FIG. 2C according to another embodiment of the invention.

In certain cases, the content protection transmitter (e.g., source device 22) may not have sufficient information to estimate Dp incurred at the content protection receiver (e.g., sink device 24). In such cases, according to an embodiment of the invention the content protection receiver can extend the NAV value (by setting the duration field) to cover the ensuing control response message (e.g., HDCP control response message) and the following ACK. FIG. 2C shows a timeline 70 for such a control message exchange according to a process 80 in FIG. 3C, according to this embodiment of the invention, as follows:

Process block 81: A content protection transmitter (e.g., source wireless station 22) sends a RTS 71 to reserve the wireless channel sufficiently long to cover at least both the both the content protection request and response frames.

Process block 82: The content protection receiver responds to the RTS 71 with CTS 72 to acknowledge the RTS and reserve the wireless channel from its neighboring wireless devices.

Process block 83: The content protection transmitter sends a request frame (e.g., HDCP control request frame) 73 and also grants the content protection receiver access/control to wireless channel by setting the RDG bit in the MAC header of the frame 73 to 1.

Process block 84: The content protection receiver sends an ACK frame 74 with the More PPDU bit in the ACK set to 1.

Process block 85: Now the content protection receiver has the access right of the wireless channel. Since a control response frame (e.g., HDCP control response frame) cannot be transmitted immediately, the content protection receiver sends a dummy frame 75, such as a QoS-NULL frame, to keep the wireless channel busy for a period Dp. The duration field of the dummy frame is changed to extend the NAV time at other third party wireless stations. In FIG. 2C, it is shown that the reception of the dummy frame 75 extends the NAV to t time units. The transmission of the RTS frame 71 sets the NAV to t' time units. When extending the TXOP, the duration of an Enhanced Distributed Channel Access transmission opportunity period (i.e., EDCA TXOP per IEEE 802.11) is bounded, for an Access Category (AC), by the value in dot11QAPEDCATXOPLimit MIB variable for an access point (AP) wireless station and in dot11EDCATableTXOPLimit MIB table for a non-AP station. EDCA provides contention-free access to the channel for the TXOP. A TXOP is a bounded time interval during which a station can send as many frames as possible (as long as the duration of the transmissions does not extend beyond the maximum duration of the TXOP).

Process block 86: After the Dp delay, the content protection receiver sends control response frame 76 (e.g., HDCP control response frame) with the More PPDU bit set to 0 that gives the control of the wireless channel back to the content protection transmitter.

Process block 87: The content protection transmitter sends an ACK 77.

Process block 88: Since the content protection receiver knows the value of Dp, the content protection receiver extends the TxOP by the exact amount based on Dp. Therefore, in most cases there would not be any waste of the TxOP and no need to send a CF-END message. However, if there is a need, then similar to the process block 68 in FIG. 3B, the content protection transmitter can transmit CF-END frame. One round of two-way control message exchange is completed.

After said control message exchange is completed, and based on the control message exchange locality check is successful (i.e., RTT for wireless message exchange between the source and sink is below a time limit according to HDCP protocol), the source and sink may proceed to communicate A/V data on the wireless channel therebetween.

A content protection process according to an embodiment of the invention includes the control message exchange processes, and mechanisms for reducing latency for said control message exchange between the wireless source and sink for locality check (e.g., HDCP) before wireless A/V data transmission therebetween, as described hereinabove in relation to FIGS. 1A, 2A, 2B, 2C, 3A, 3B, 3C.

Embodiments of the present invention reduce the content protection delays related to frame exchange time between a wireless sink and wireless source, by extending the length of transmission opportunity to accommodate for both the request and response frames involved in content protection. Embodiments of the present invention provides a content access protection method and system wherein a wireless source device (e.g., Wi-Fi Display source) obtains a TxOP and sends a request control message (e.g., HDCP control message), explicitly granting the control of the TxOP to the wireless sink (e.g., Wi-Fi Display sink). The wireless sink may delay a response (e.g., HDCP response frame) by inserting a dummy frame (e.g., QoS-NULL frame) and optionally extending the TxOP to cover the control message response. Embodiments of the present invention reduce implementation cost for content protection mechanisms.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 4:
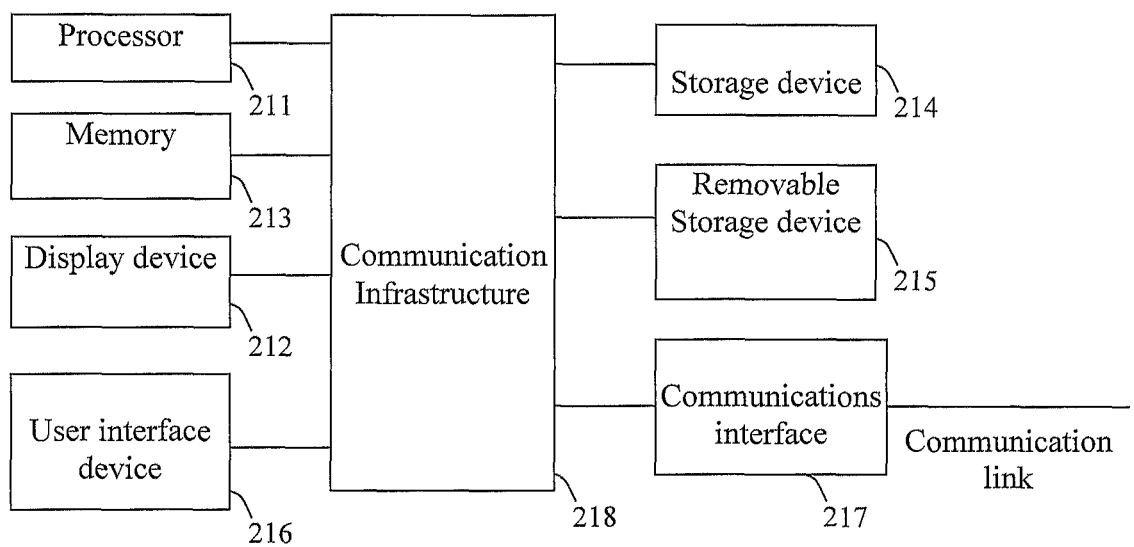
FIG. 4 is a high level block diagram showing an information processing system comprising a computer system useful for implementing an embodiment of the invention.

FIG. 4 is a high level block diagram showing an information processing system comprising a computer system 200 useful for implementing an embodiment of the present invention. The computer system 200 includes one or more processors 211, and can further include an electronic display device 212 (for displaying graphics, text, and other data), a main memory 213 (e.g., random access memory (RAM)), storage device 214 (e.g., hard disk drive), removable storage device 215 (e.g., removable storage drive, removable memory module, a magnetic tape drive, optical disk drive, computer readable medium having stored therein computer software and/or data), user interface device 216 (e.g., keyboard, touch screen, keypad, pointing device), and a communication interface 217 (e.g., modem, a network interface (such as an Ethernet card), a communications port, or a PCMCIA slot and card). The communication interface 217 allows software and data to be transferred between the computer system and external devices. The system 200 further includes a communications infrastructure 218 (e.g., a communications bus, cross-over bar, or network) to which the aforementioned devices/modules 211 through 217 are connected.

Information transferred via communications interface 217 may be in the form of signals such as electronic, electromagnetic, optical, or other signals capable of being received by communications interface 217, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication, comprising:
reserving a wireless communication medium for a time period that accommodates control message exchange for content protection in data communication between a wireless transmitter and a wireless receiver over the wireless communication medium;
the control message exchange including:
    transmitting a control request message for content protection over the wireless communication medium,
    transmitting a control response message in reply to the request message, and
    transmitting a frame for releasing a portion of a transmission opportunity period;
wherein reserving the wireless communication medium includes reserving the wireless communication medium for a time period that accommodates said control message exchange, such that the time period comprises a single transmission opportunity period for communication on the wireless communication medium, to reduce latency for said control message exchange between the wireless transmitter and the wireless receiver.

2. The method of claim 1, wherein reserving the wireless communication medium further comprises reserving the transmission opportunity period prior to said control message exchange, wherein reserving said transmission opportunity period includes:
    transmitting a request-to-send (RTS) from the wireless transmitter to the wireless receiver over the wireless communication medium to reserve said transmission opportunity period; and
    transmitting a clear-to-send (CTS) from the wireless receiver to the wireless transmitter over the wireless communication medium in reply to the RTS to reserve the wireless communication medium for the transmission opportunity period.

3. The method of claim 2, wherein:
the control message exchange further includes the wireless transmitter transmitting said control request message and granting the wireless receiver control of the wireless communication medium.

4. The method of claim 3, wherein:
the control message exchange further includes the wireless receiver transmitting an ACK in reply to the control request message, before transmitting said control response message.

5. The method of claim 4, wherein:
the control message exchange further includes, after receiving the control response message, the wireless transmitter transmitting an ACK, and transmitting the frame before releasing the portion of the transmission opportunity period, wherein the portion of the transmission opportunity period comprises a remainder of the transmission opportunity period.

6. The method of claim 5, wherein:
the control message exchange further includes, the wireless transmitter or the wireless receiver releasing the remainder of the transmission opportunity period reservation after transmission of the control response message.

7. The method of claim 6, wherein:
reserving the wireless communication medium further includes reserving the wireless communication medium for a time period that accommodates transmission of said control request message, processing delay at the wireless receiver, and transmission of said control response message from the wireless receiver, within a single transmission opportunity period.

8. The method of claim 7, wherein:
the control message exchange further includes, after transmitting the ACK and prior to transmitting the control response message, the wireless receiver transmitting a dummy message to maintain the wireless communication medium busy for the duration of said processing delay at the wireless transmitter.

9. The method of claim 6, wherein:
the control message exchange further includes, after transmitting the ACK and prior to transmitting the control response message, the wireless receiver transmitting a dummy message to maintain the wireless communication medium busy for a duration of a processing delay at the wireless transmitter, such that the wireless transmitter extends the transmission opportunity period to accommodate transmission of the control response message.

10. The method of claim 2, wherein the control message exchange comprises locality check message exchange.

11. The method of claim 10, further comprising:
if locality check is successful, the wireless transmitter and wireless receiver performing data communication therebetween on the wireless communication medium.

12. The method of claim 11, wherein the locality check message exchange comprises check message exchange according to High-bandwidth Digital Content Protection (HDCP).

13. The method of claim 12, wherein:
the wireless communication medium comprises a radio frequency wireless channel;
the wireless transmitter and the wireless receiver communicate in a wireless local area network.

14. The method of claim 13, wherein:
the wireless transmitter includes an audio/video source;
the wireless receiver includes an audio/video sink; and
the data communication comprises audio/video data communication over the wireless channel in the wireless local area network.

15. A wireless communication system, comprising:
a wireless transmitter; and
a wireless receiver for communication with the wireless transmitter over a wireless channel;
a latency controller that reserves the wireless channel for a time period that accommodates control message exchange for content protection in data communication between the wireless transmitter and the wireless receiver over the wireless channel;
wherein the control message exchange includes:
transmitting a control request message for content protection over the wireless channel,
transmitting a control response message in reply to the request message, and
transmitting a frame for releasing a portion of a transmission opportunity period;
wherein reserving the wireless channel includes reserving the wireless channel for a time period that accommodates said control message exchange, such that the time period comprises a single transmission opportunity period for communication on the wireless channel, to reduce latency for said control message exchange between the wireless transmitter and the wireless receiver.

16. The system of claim 15, wherein the transmission opportunity period is reserved prior to said control message exchange, by transmitting a request-to-send (RTS) from the wireless transmitter to the wireless receiver over the wireless channel to reserve said transmission opportunity period, and transmitting a clear-to-send (CTS) from the wireless receiver to the wireless transmitter over the wireless channel in reply to the RTS to reserve the wireless channel for the transmission opportunity period.

17. The system of claim 16, wherein the control message exchange further includes the wireless transmitter transmitting said control request message and granting the wireless receiver control of the wireless channel.

18. The system of claim 17, wherein the control message exchange further includes the wireless receiver transmitting an ACK in reply to the control request message, before transmitting said control response message.

19. The system of claim 18, wherein the control message exchange further includes releasing the portion of the transmission opportunity period reservation after transmission of the control response message, wherein the portion of the transmission opportunity period comprises a remainder of the transmission opportunity period.

20. The system of claim 19, wherein:
the control message exchange further includes, after receiving the control response message, the wireless transmitter transmitting an ACK, before releasing the remainder of the transmission opportunity period.

21. The system of claim 19, wherein wireless channel reservation further includes reserving the wireless channel for a time period that accommodates transmission of said control request message, processing delay at the wireless receiver, and transmission of said control response message from the wireless receiver, within a single transmission opportunity period.

22. The system of claim 21, wherein the control message exchange further includes, after transmitting the ACK and prior to transmitting the control response message, the wireless receiver transmitting a dummy message to maintain the wireless channel busy for the duration of said processing delay at the wireless transmitter.

23. The system of claim 19, wherein the control message exchange further includes, after transmitting the ACK and prior to transmitting the control response message, the wireless receiver transmitting a dummy message to maintain the wireless channel busy for a duration of a processing delay at the wireless transmitter, such that the wireless transmitter extends the transmission opportunity period to accommodate transmission of the control response message.

24. The system of claim 16, wherein the control message exchange comprises locality check message exchange.

25. The system of claim 24, wherein if locality check is successful, the wireless transmitter and wireless receiver perform data communication therebetween on the wireless channel.

26. The system of claim 25, wherein the locality check message exchange comprises check message exchange according to High-bandwidth Digital Content Protection (HDCP).

27. The system of claim 26, wherein:
the wireless channel comprises a radio frequency wireless channel;
the wireless transmitter and the wireless receiver communicate in a wireless local area network.

28. The system of claim 27, wherein:
the wireless transmitter includes an audio/video source including an HDCP transmitter;

the wireless receiver includes an audio/video sink including an HDCP receiver; and the data communication comprises audio/video data communication over the wireless channel in the wireless local area network.

29. A wireless transmitter, comprising:

a physical (PHY) layer for communication with a wireless receiver over a wireless channel;

a latency controller that reserves a wireless channel for a time period that accommodates control message exchange for content protection in data communication between the wireless transmitter and the wireless receiver over a wireless channel;

wherein the control message exchange includes:
 transmitting a control request message for content protection over a wireless channel,
 transmitting a control response message in reply to the request message, and
 transmitting a frame for releasing a portion of a reserved transmission opportunity period;

wherein reserving the wireless channel includes reserving the wireless channel for a time period that accommodates said control message exchange, such that the time period comprises a single transmission opportunity period for communication on the wireless channel, to reduce latency for said control message exchange between the wireless transmitter and the wireless receiver.

30. A wireless receiver, comprising:

a physical (PHY) layer for communication with a wireless transmitter over a wireless channel;

a latency controller that reserves the wireless channel for a time period that accommodates control message exchange for content protection in data communication between the wireless transmitter and the wireless receiver over the wireless channel;

wherein the control message exchange includes:
 transmitting a control request message for content protection over the wireless channel,
 transmitting a control response message in reply to the request message, and
 transmitting a frame for releasing a portion of a reserved transmission opportunity period;

wherein reserving the wireless channel includes reserving the wireless channel for a time period that accommodates said control message exchange, such that the time period comprises a single transmission opportunity period for communication on the wireless channel, to reduce latency for said control message exchange between the wireless transmitter and the wireless receiver.

31. The method of claim 1, wherein the frame comprises a CF-END frame.

32. The method of claim 31, wherein the wireless transmitter transmits the CF-END frame for releasing an unused transmission opportunity period for access to the wireless channel.

33. The method of claim 1, wherein the control message exchange comprises: the wireless transmitter transmitting the control request message for content protection to the wireless receiver over a wireless communication medium, the wireless receiver transmitting a control response message to the wireless transmitter in reply to the request message, and the wireless transmitter transmitting a frame for releasing a portion of a transmission opportunity period.

* * * * *